US009958716B2

(12) United States Patent
Matsumoto et al.

(10) Patent No.: US 9,958,716 B2
(45) Date of Patent: May 1, 2018

(54) DISPLAY APPARATUS

(71) Applicant: Sakai Display Products Corporation, Sakai-shi, Osaka (JP)

(72) Inventors: Kouji Matsumoto, Sakai (JP); Ryota Kawabata, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days. days.

(21) Appl. No.: 15/035,350

(22) PCT Filed: Nov. 8, 2013

(86) PCT No.: PCT/JP2013/080218
§ 371 (c)(1),
(2) Date: May 9, 2016

(87) PCT Pub. No.: WO2015/068256
PCT Pub. Date: May 14, 2015

(65) Prior Publication Data
US 2016/0291389 A1 Oct. 6, 2016

(51) Int. Cl.
*G02F 1/1333* (2006.01)
*F21V 8/00* (2006.01)
*G02F 1/1335* (2006.01)

(52) U.S. Cl.
CPC ....... *G02F 1/133308* (2013.01); *G02B 6/002* (2013.01); *G02B 6/0065* (2013.01);
(Continued)

(58) Field of Classification Search
CPC ........................ G02F 1/133308; G02B 6/002
See application file for complete search history.

(56) References Cited

U.S. PATENT DOCUMENTS

2003/0223020 A1* 12/2003 Lee ...................... G02B 6/0088
349/58
2004/0114345 A1* 6/2004 Kim ..................... G02B 6/0021
362/613
(Continued)

FOREIGN PATENT DOCUMENTS

JP 2008-275870 A 11/2008

*Primary Examiner* — Sang V Nguyen
(74) *Attorney, Agent, or Firm* — Rudy J. Ng; Bret E. Field; Bozicevic, Field & Francis LLP

(57) ABSTRACT

Provided is a display apparatus having a holding structure for an optical sheet capable of preventing wrinkles, bending, and sheet damage to the optical sheet in the display apparatus, and preventing defects such as irregular brightness and reduced brightness.

A chassis for holding an optical sheet of a rectangular shape holds the peripheral edge part of the optical sheet at a holding surface of hollow rectangular shape, and has engaging parts to hold the optical sheet provided to stand at the edge part of one side of the holding surface. The holding surface is inclined or has a stepped protuberance formed, whereby the surface of the other region opposite of the end part of the one region on which the engaging parts is provided to stand is closer to the display panel than the surface of the one region of the holding surface within the height range of the engaging part, wherein the one region and the other region are present on the opposite side with respect to an opening of the holding surface.

7 Claims, 6 Drawing Sheets

(52) U.S. Cl.
CPC ..... *G02B 6/0068* (2013.01); *G02F 1/133528* (2013.01); *G02F 1/133553* (2013.01); *G02F 2001/133317* (2013.01); *G02F 2001/133354* (2013.01); *G02F 2201/54* (2013.01)

(56) References Cited

U.S. PATENT DOCUMENTS

| | | | |
|---|---|---|---|
| 2004/0114396 A1* | 6/2004 | Kobayashi | G02F 1/1336 362/561 |
| 2005/0062062 A1* | 3/2005 | Bertin | B82Y 10/00 257/200 |
| 2005/0099604 A1* | 5/2005 | Mizumaki | G03B 23/08 353/27 R |
| 2007/0008450 A1* | 1/2007 | Ueda | G02F 1/133608 349/58 |
| 2008/0170170 A1* | 7/2008 | Jung | G02B 6/0021 349/58 |
| 2008/0266487 A1* | 10/2008 | Furukawa | G02F 1/133608 349/62 |
| 2011/0128756 A1* | 6/2011 | Cho | G02B 6/0068 362/606 |
| 2012/0032201 A1* | 2/2012 | Chou | G09F 9/301 257/88 |
| 2012/0281153 A1* | 11/2012 | Kuromizu | G02B 6/0088 348/790 |
| 2012/0281367 A1* | 11/2012 | He | H05K 5/02 361/728 |
| 2013/0314612 A1* | 11/2013 | Kuroda | G02F 1/133602 348/739 |
| 2014/0092339 A1* | 4/2014 | Yoshimura | G02F 1/133308 349/58 |
| 2015/0160407 A1* | 6/2015 | Hsiao | G02F 1/133308 349/65 |

\* cited by examiner

DISPLAY APPARATUS

This application is the national phase under 35 U.S.C. § 371 of PCT International Application No. PCT/JP2013/080218 which has an International filing date of Nov. 8, 2013 and designated the United States of America.

BACKGROUND OF THE INVENTION

1. Field of the Invention

The present invention relates to a display apparatus which displays an image using a liquid crystal panel. Particularly, the present invention relates to a display apparatus which has a holding structure of a sheet capable of preventing an occurrence of problems such as luminance unevenness, or a decrease in luminance due to wrinkles, deflection, damage, or the like of an optical sheet used in the display apparatus, while thinning the display apparatus.

2. Description of Related Art

A display apparatus using a liquid crystal panel is provided with an optical sheet for diffusing or collecting light emitted from a light source. The optical sheet is provided between the liquid crystal panel and the light source.

The optical sheet includes one or a plurality of optical films. The optical sheet is mainly thermally expanded due to heat from the light source. Thereby, the optical sheet is held with a margin given by as much as the expansion, in such a way that only a part thereof is hooked to a positioning member. For example, the optical sheet is a rectangular shape, and is provided with a plurality of holes in an edge part on one long side thereof. The optical sheet is hooked to the positioning member by penetrating the positioning pins provided on the positioning member into the plurality of holes. In this case, since edge parts of the optical sheet other than the edge part on the one long side are not supported, wrinkling or deflection does not occur in the optical sheet when thermally expanded.

However, in the structure in which the optical sheet is hooked by the positioning pins to be held, the optical sheet may move in a direction perpendicular to a surface thereof, and fluctuation occurs. In a situation in which strong vibrations are applied during a vibration test, transportation, or the like, peripheral edges of the optical sheet are rubbed by the fluctuation thereof to cause sheet damage. If there is sheet damage in the optical sheet, problems such as luminance unevenness, or a decrease in luminance may occur in the display apparatus.

A configuration is disclosed in which a backlight box for housing a light source has an inclination at a height of peripheral walls thereof, and peripheral edge parts of the optical sheet are held by end faces of the peripheral walls.

In particular, the disclosed backlight box is formed in a rectangular box shape with one surface open, and the height of a peripheral wall corresponding to one long side of a bottom of the box among four peripheral walls is higher than that of the peripheral wall corresponding to the other long side of the bottom of the box. In addition, peripheral walls corresponding to both of the short sides of the bottom of the box are configured so as to be lowered toward the other long side from the one long side, and peripheral end faces thereof are inclined with respect to the bottom at a prescribed angle. A diffusion plate is fixed to the peripheral end face, and hooking parts of the optical sheet are provided on the peripheral end face of the other long side.

SUMMARY OF THE INVENTION

The display apparatus disclosed is used in a state in which the higher peripheral wall among the peripheral walls of the backlight box faces down, and the bottom stands in a vertical direction. In this case, the optical sheet is held so as to be hung on the hooking parts provided on the peripheral end face of the lower peripheral wall. Since the peripheral end faces of the backlight box are inclined with respect to the bottom at a prescribed angle, peripheral edge parts other than one edge part corresponding to the hooking parts among the peripheral edge parts of the optical sheet are pressed and come into close contact with the inclined diffusion plate of the backlight box due to their own weight, to be stabilized. Thereby, it is possible to restrain an occurrence of the fluctuation in which the optical sheet moves in the direction perpendicular to the surface thereof.

In the display apparatus, thinning and slimmed border are required. A holding structure of the optical sheet should be provided within a limited range of being hidden by the frame, and further also within a limited space in a thickness direction.

In the disclosed invention, the fluctuation of the optical sheet may be restrained. However, an inclination angle of the optical sheet is an inclination angle corresponding to the weight of the optical sheet, and is selected so as to maintain adhesion of the optical sheet to the diffusion plate, but does not consider the limitation of the space with respect to the holding structure.

In consideration of the above-mentioned circumstances, it is an object of the present invention to provide a display apparatus which has a holding structure of a sheet capable of restraining fluctuation of an optical sheet in the display apparatus, while coping with a request for thinning and slimmed border.

A display apparatus according to one embodiment of the present invention, including a display panel and an optical sheet of a rectangular shape provided behind the display panel, comprising: a holding frame body having a holding surface which holds peripheral parts of the optical sheet; a plurality of engagement holes juxtaposed in an edge part close to one side of the optical sheet; and a plurality of engaging parts provided to stand on one region of the holding surface corresponding to the one side of the optical sheet, positions of the engaging parts corresponding to the engagement holes of the optical sheet; wherein a surface of the other region of the holding surface is closer to the display panel than a surface of the one region of the holding surface, within a range the surface of the other region does not protrude from a plane which is parallel to the display panel and includes front tips of the engaging parts.

In the display apparatus according to the embodiment of the present invention, the holding surface may be inclined with respect to the display panel.

In the display apparatus according to the embodiment of the present invention, both side parts other than the one region and the other region in the holding surface may have stepped-protrusions which are formed so that the other region is higher than the one region.

According to the embodiment of the present invention, a distance between the display panel and the holding surface in the optical sheet frame body which holds the optical sheet is equivalent to a height of the engaging parts in the one region of the holding surface provided with the engaging parts, and a surface in an opposite side of the one region of the holding surface with respect to an opening of the holding surface is close to the display panel therebetween. Therefore, a spatial distance of a space in a thickness direction, into which a free end of the optical sheet on the side opposite to the side having the engagement holes to the engaging part is entered, is narrower than a periphery of the engagement holes, and fluctuation of the optical sheet is suppressed. Further, a distance between the holding surface and the display panel is within a limited range equivalent to the height of the engaging part.

According to the embodiment of the present invention, the holding surface which holds the peripheral edge part of the optical sheet is inclined so that the region of the holding surface opposite to the region having the engaging parts with respect to the opening comes into close proximity to the display panel. Thereby, the optical sheet is supported so that an end portion on the side opposite to the positions in the optical sheet provided with the engagement holes gradually approaches the display panel. The spatial distance of the space in the thickness direction, into which the free end of the optical sheet on the side opposite to the side having the engagement hole is entered, is narrower than the periphery of the engagement hole. Thereby, fluctuation of the optical sheet is suppressed.

According to the embodiment of the present invention, both side parts between the surface on the one region on which the engaging parts are provided to stand and the surface on the opposite region with respect to the opening in the holding surface which hold the optical sheet protrude so as to be gradually increased toward the surface on the opposite region, within a range lower than the height of the engaging part. Thereby, edge parts other than the positions in which the engagement holes of the optical sheet are penetrated are supported by stepped portions so as to be inclined to the display panel. The spatial distance of the space in the thickness direction, into which the free end of the optical sheet on the side opposite to the engagement hole is entered, is narrower than the periphery of the engagement hole. Thereby, fluctuation of the optical sheet is suppressed.

According to the embodiment of the present invention, it is possible to suppress the fluctuation of the optical sheet in the thickness direction in the display apparatus. Thereby, it is possible to prevent sheet damage of the optical sheet, and problems such as luminance unevenness, or a decrease in luminance, while coping with a request for thinning and slimmed border.

DESCRIPTION OF THE PREFERRED EMBODIMENTS

Hereinafter, embodiments of the present invention will be described in detail with reference to the accompanying drawings. Further, in the embodiments which will be disclosed below, an example in which the present invention is applied to a display apparatus using a liquid crystal panel will be described in detail.

Embodiment 1

Figure 1:
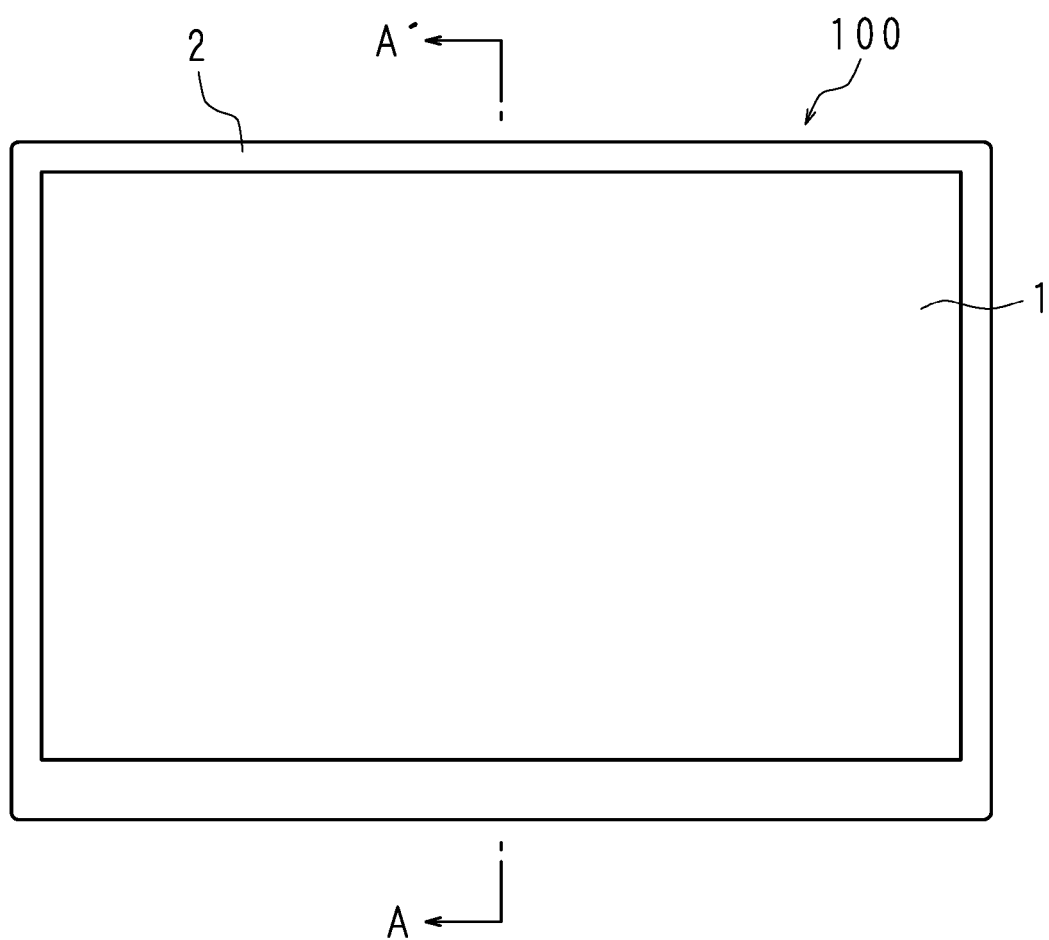
FIG. 1 is a front view illustrating an appearance of a display apparatus according to Embodiment 1.

FIG. 1 is a front view illustrating an appearance of a display apparatus 100 according to Embodiment 1. The display apparatus 100 is formed by positioning and housing a liquid crystal panel 1 and other parts by a plurality of other chassis including a first chassis 2.

Figure 2:
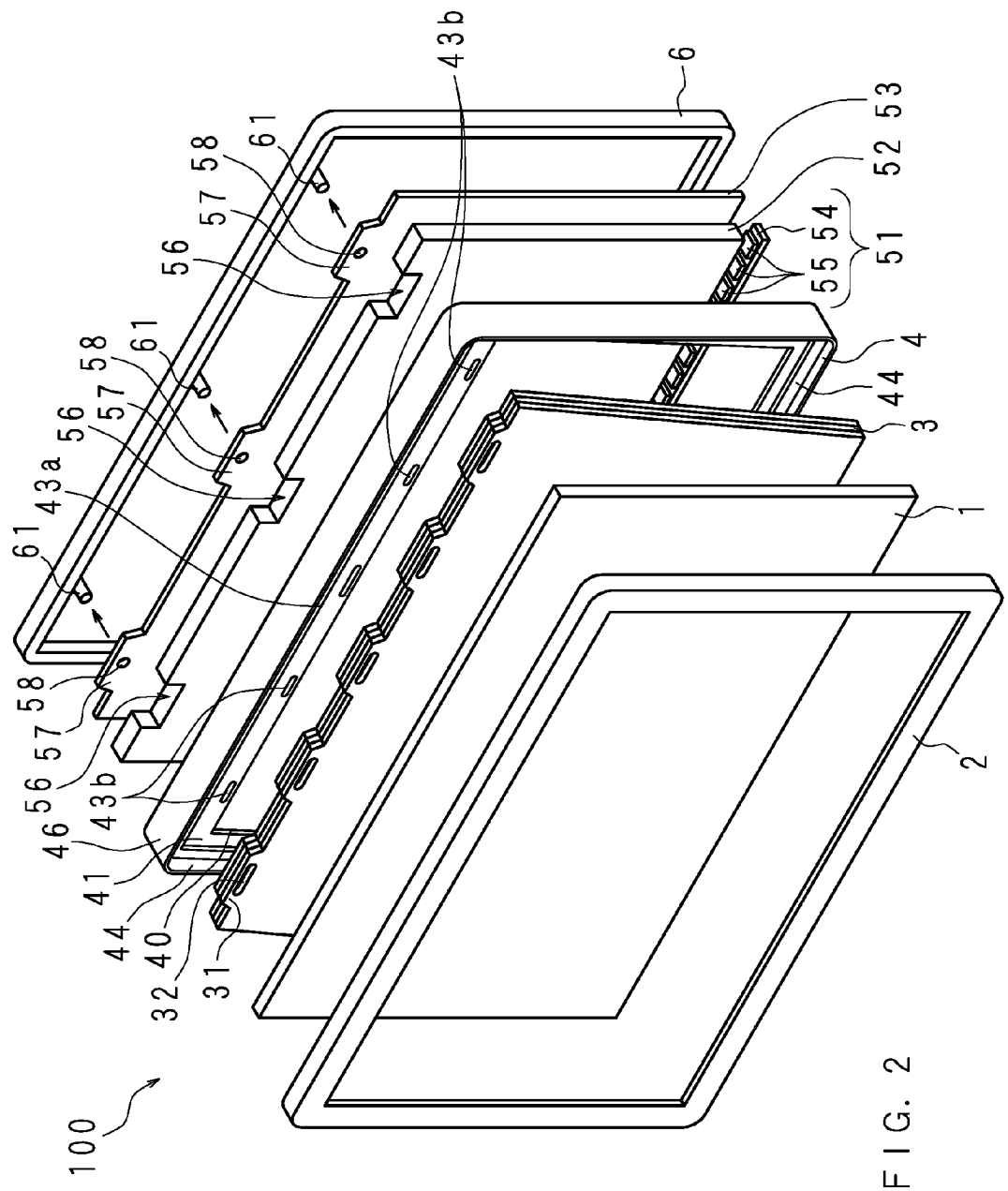
FIG. 2 is an exploded perspective view schematically illustrating main components included in the display apparatus according to Embodiment 1.
Figure 3:
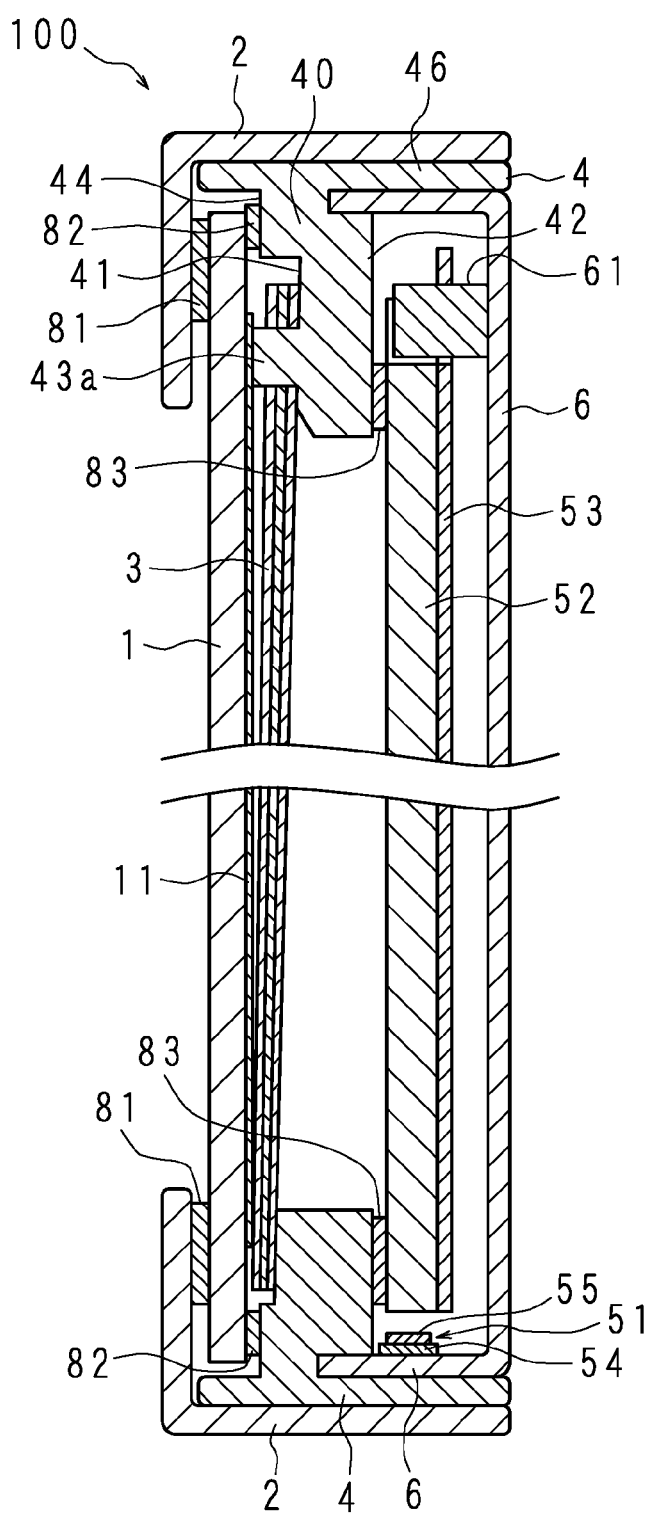
FIG. 3 is a longitudinal-sectional view taken on line A-A' of FIG. 1.

FIG. 2 is an exploded perspective view schematically illustrating main components included in the display apparatus 100 according to Embodiment 1, and FIG. 3 is a longitudinal-sectional view taken on line A-A' of FIG. 1.

The display apparatus 100 includes the liquid crystal panel 1, the first chassis 2, an optical sheet 3, a second chassis 4, a light guide plate 52, a light source 51, a reflection sheet 53, and a third chassis 6.

The first chassis 2 is a rectangular-shaped frame body. The first chassis 2 includes a side plate of a rectangular and cylindrical shape, and a frame part of a hollow plate protruding inward from one end portion of the side plate, and has an L-shaped cross section.

The liquid crystal panel 1 is a display panel, and is formed in a rectangular plate shape. The liquid crystal panel 1 employs an active matrix type. The liquid crystal panel 1 is formed by sealing a liquid crystal between two transparent substrates disposed to face each other at a prescribed interval. The liquid crystal panel 1 may be provided with a polarizing plate, a protective sheet, a glass plate, or the like on a display surface thereof. Further, a polarizing plate 11 is provided on a surface opposite to the display surface of the liquid crystal panel 1.

The optical sheet 3 is a rectangular shape, and is a three-optical sheet group in which one prism sheet is sandwiched by two diffusion sheets. The optical sheet 3 has five ear parts 31 on one long side thereof. Each ear part 31 is formed in a tapered trapezoidal shape. Each ear part 31 is provided with an engagement hole 32. The engagement hole 32 is formed in a slot shape elongated in a longitudinal direction of the optical sheet 3.

The second chassis 4 is a frame body provided with a peripheral plate 46 at outer peripheral edges of a rectangular plate-shaped holding plate 40, and a rectangular opening at a central part of the holding plate 40. The second chassis 4 has a T-shaped cross section with the longitudinal line is corresponding to the holding plate 40 and as the horizontal line is corresponding to the peripheral plate 46, but on both of the long sides, one surface 41 of the holding plate 40 is not perpendicular to the peripheral plate 46. An inclination angle formed by a short side direction of the one surface of the holding plate 40 and a normal direction of the peripheral plate 46 will be described in detail below.

In addition, the second chassis 4 includes a plurality of engaging parts 43a and 43b juxtaposed in the longitudinal direction at an edge part on the one long side of the one surface 41 of the holding plate 40. The plurality of engaging parts 43a and 43b include a total of five engaging parts of a center engaging part 43a and the other engaging parts 43b. Each of the engaging parts 43a and 43b is provided to stand on the one surface 41 of the holding plate 40. The engaging parts 43a and 43b have an elliptical cross section elongated in the longitudinal direction of the holding plate 40, and a length of the elliptical cross section of the other engaging parts 43b is shorter than the length of the elliptical cross section of the center engaging part 43a.

The holding plate 40 of the second chassis 4 is provided with convex parts 44 on an outer peripheral edge part of the one surface 41 thereof. The convex part 44 has a hollow surface orthogonal to the peripheral plate 46. Further, the holding plate 40 of the second chassis 4 is provided with a peripheral groove in an outer peripheral edge of a surface 42 opposite to the surface 41.

The light source 51 is achieved by juxtaposing a plurality of light emitting diodes (LEDs) 55 on an elongated substrate 54 in the longitudinal direction.

The light guide plate 52 is formed in a rectangular flat plate shape. The light guide plate 52 is made of, for example, a high transparency resin such as an acrylic resin. The light guide plate 52 has three notches 56 in an edge part on one long side thereof. Each of the notches 56 is formed by cutting off the light guide plate 52 in a rectangle in the thickness direction.

The reflection sheet 53 is a rectangular-shaped optical sheet having a reflection function. The reflection sheet 53 has three convex parts 57 on one long side thereof. Each convex part 57 is provided with a substantially circular hole 58.

The third chassis 6 is formed in a rectangular box body with one surface open. The third chassis 6 is provided with three columnar members 61 juxtaposed on an edge part of one long side of a bottom thereof in the longitudinal direction. Each columnar member 61 is formed in a substantially cylindrical shape, and is erectly disposed from the bottom of the third chassis 6.

The above-described respective elements are assembled as described below to form the display apparatus 100.

First, the reflection sheet 53 is installed on the bottom of the third chassis 6. Three convex parts 57 of the reflection sheet 53 and three columnar members 61 of the third chassis 6 have a positional relationship corresponding to each other. The hole 58 of the convex part 57 has a shape substantially equal to the cross section shape of the columnar member 61. The reflection sheet 53 is held by inserting three columnar members 61 of the third chassis 6 into the holes 58 of three convex parts 57.

The light source 51 is installed inside from a side surface on the one long side opposite to the side on which the columnar members 61 of the third chassis 6 are provided in the longitudinal direction, so that an emission direction thereof is oriented inwardly.

The light guide plate 52 is also installed in the third chassis 6. The light guide plate 52 is installed so that an end face opposite to an end face having the notches 56 faces the light source 51, and one wide surface faces a reflection surface of the reflection sheet 53. A size of the wide surface of the light guide plate 52 is equal to or slightly smaller than the size of the reflection sheet 53. In addition, a length of one long side of the light guide plate 52 is substantially equal to the length of the juxtaposed light emitting diodes 55 of the light source 51. Three notches 56 of the light guide plate 52 are provided for avoiding the columnar members 61 which have been inserted into the holes 58 of the reflection sheet 53.

Next, the second chassis 4 is installed so as to cover the opened one surface of the third chassis 6 with the holding plate 40. An inner periphery of the peripheral plate 46 of the second chassis 4 is larger than the outer periphery of a side plate of the third chassis 6. The inner periphery of the peripheral plate 46 of the second chassis 4 is fitted to the outer periphery of the side plate of the third chassis 6 on which the light source 51, the light guide plate 52, the reflection sheet 53 and other parts are placed. In this case, the second chassis 4 is fitted, so that one long side thereof on the engaging parts 43a and 43b corresponds to the side having the notches 56 of the light guide plate 52, and the surface 42 on the side opposite to the surface 41 in which the engaging parts 43a and 43b of the holding plate 40 are provided faces the third chassis 6. Further, as illustrated in FIG. 3, a peripheral end face of the side plate of the third chassis 6 is adapted so as to be inserted into the groove provided in the surface 42 of the holding plate 40. By fitting the second chassis 4 and the third chassis 6 with each other, the reflection sheet 53 and the light guide plate 52 are positioned. The size of the opening in the holding plate 40 of the second chassis 4 is smaller than the wide surface of the light guide plate 52, and the surface 42 of the holding plate 40 of the second chassis 4 is adapted so as to presses the peripheral edge part of the light guide plate 52 through spacers 83.

Linear light from the light source 51 is made incident inside of the light guide plate 52 from an end face which faces the light source 51 of the light guide plate 52, and is repeatedly subjected to a total reflection by the reflection sheet 53 and a partial reflection by the other surface to proceed in the light guide plate 52. The light in the light guide plate 52 is emitted from the wide surface on the side opposite to the reflection sheet 53 as flat light. As described above, the light source device by the edge light type may be achieved.

The optical sheet 3 is supported by the second chassis 4 so as to cover the opening of the holding plate 40 of the second chassis 4. The size of the optical sheet 3 is larger than the opening of the second chassis 4, and the peripheral edge parts of the optical sheet 3 are held by a hollow rectangular surface (hereinafter, referred to as a holding surface) 41 of the holding plate 40. The second chassis 4 positions and holds the optical sheet 3 by engaging the engagement holes 32 of the ear parts 31 of the optical sheet 3 to the respective engaging parts 43a and 43b. The center engaging part 43a has substantially the same cross section as the shape of the engagement hole 32 of the center ear part 31 of the optical sheet 3. Thereby, the optical sheet 3 is accurately positioned in the second chassis 4. A length of the cross section of the other engaging parts 43b in the longitudinal direction is shorter than the length of the other ear parts 31 of the optical sheet in the longitudinal direction of the engagement hole 32. Briefly, in the other engaging parts 43b, there is a gap between the engaging parts 43b and the engagement holes 32. Thereby, even when the optical sheet 3 is thermally expanded, since the thermal expansion amount may be absorbed by the engagement holes 32 within a range of the gap between the engaging part 43b and the engagement hole 32, the optical sheet 3 is not wrinkled. A length (height) of the engaging parts 43a and 43b in a standing direction is slightly longer than a sheet thickness of the optical sheet 3. Further, the holding surface 41 of the second chassis 4 is inclined with respect to the light guide plate 52. Therefore, the optical sheet 3 held by the holding surface 41 of the second chassis 4 is held in an orientation inclined in a lateral direction with respect to the light guide plate 52. As described above, the optical sheet 3 held by the second chassis 4 diffuses light made incident on one surface of the light guide plate 52, and emits flat light having more uniform luminance distribution from the opposite surface.

The liquid crystal panel 1 is provided at a position on the side of the optical sheet 3 opposite to the side having the light guide plate 52, so that a display surface thereof faces the side opposite to the optical sheet 3. The size of the liquid crystal panel 1 is slightly larger than the optical sheet 3. The liquid crystal panel 1 is placed on annular flat surfaces of the convex parts 44 in the holding plate 40 of the second chassis 4 through spacers 82, and is sandwiched between a frame part of the first chassis 2 and the convex parts 44 through spacers 81. The polarizing plate 11 adhered to the surface on the side opposite to the display surface of the liquid crystal panel is smaller than the liquid crystal panel 1, and slightly smaller than the optical sheet 3. The peripheral edge part of the liquid crystal panel 1, that is, residual portions of the polarizing plate 11 is held by the convex parts 44 through the spacers 82. In this case, the polarizing plate 11 is adapted so as to abut front tips of the engaging parts 43a and 43b of the second chassis 4. Since the liquid crystal panel 1 is placed on the surfaces of the convex parts 44 perpendicular to the peripheral plate 46 of the second chassis 4, this panel is substantially parallel to the light guide plate 52, but is not parallel to the optical sheet 3.

The size of the opening of the first chassis 2 is smaller than the display surface of the liquid crystal panel 1, and the outer periphery of the side plate of the first chassis 2 is larger than the outer periphery of the peripheral plate 46 of the second chassis 4. The second chassis 4 is adapted so that an outside of the peripheral plate 46 thereof is fitted to an inner side of the side plate of the first chassis 2. In this case, the display surface of the liquid crystal panel 1 is exposed from the opening of the first chassis 2, and thereby it is possible to view from the outside.

In the display apparatus 100 configured as described above, flat light which is emitted from the optical sheet 3 and has a uniform luminance distribution is made incident on the side opposite to the display surface of the liquid crystal panel 1, and is modulated at locations corresponding to a plurality of pixels based on image signals by the liquid crystal panel 1. Thereby, a viewer may view a moving image by the display apparatus 100.

Thinning and slimmed border are required in the display apparatus 100. To achieve slimmed border, and consider an expansion due to heat inside the display apparatus 100, a structure in which, the optical sheet 3 is held by a frame-shaped chassis of being engaged to the engagement hole by the engaging part as described above, is preferable. However, in this case, since the optical sheet 3 has a free end, in order to prevent sheet damage under a specific condition such as at the time of a vibration test, transportation, or the like, there is a problem to be solved of restraining fluctuation of the sheet in the thickness direction, and it is necessary to achieve the suppression of fluctuation while coping with the request of thinning.

In addition, the second chassis 4 of the display apparatus 100 according to Embodiment 1 has a holding structure capable of suppressing the fluctuation of the optical sheet 3 in the thickness direction within a limited space. Hereinafter, the structure of the second chassis 4 will be described in detail.

Figure 4:
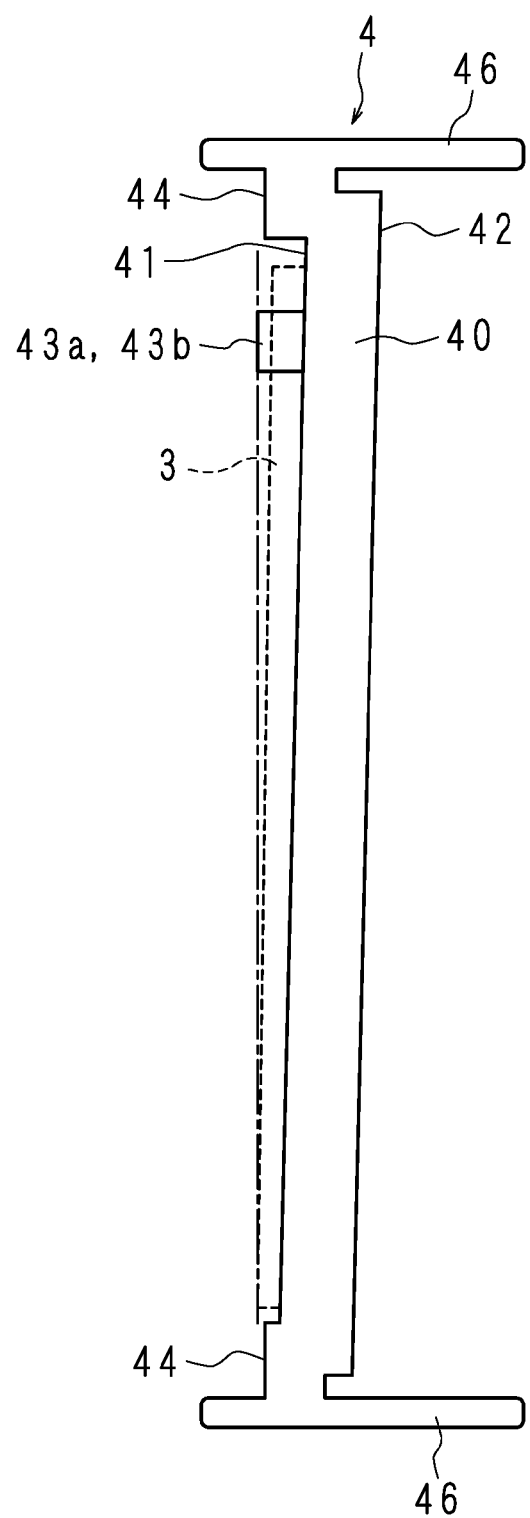
FIG. 4 is a longitudinal-sectional view illustrating a second chassis according to Embodiment 1.

FIG. 4 is a longitudinal-sectional view illustrating the second chassis 4 according to Embodiment 1. FIG. 4 illustrates a cross section when cutting an edge part of the holding plate 40 of the second chassis 4 on one short side in the lateral direction. Further, a dashed line in FIG. 4 illustrates an outline of the cross section of the optical sheet 3 to be held.

The light guide plate 52 and the liquid crystal panel 1 are positioned substantially parallel to the surface perpendicular to the peripheral plate 46, by the first chassis 2, the second chassis 4 and the third chassis 6. A one-dot chain line in FIG. 4 corresponds to a rear surface of the polarizing plate 11 adhered to the surface opposite to the display surface of the liquid crystal panel 1 (see FIG. 3), and is substantially parallel to the surface perpendicular to the peripheral plate 46. Compared with this, as illustrated in FIG. 4, the lateral direction of the holding plate 40 of the second chassis 4 is not perpendicular to the peripheral plate 46. The holding plate 40 is inclined so that the one long side provided with the engaging parts 43a and 43b is tilted to the light guide plate 52, and an inclination angle thereof is within a range in which another long side does not protrude toward the liquid crystal panel 1 from the surface of the polarizing plate 11, when the front tips of the engaging parts 43a and 43b abut the surface of the polarizing plate 11.

In particular, the inclination angle of the holding plate 40 (an angle formed by the lateral direction of the holding plate 40 with respect to the normal line of the peripheral plate 46) substantially corresponds to an apex angle of an isosceles triangle having a line segment of a length of a residual portion from the sheet thickness of the optical sheet 3 within the height of the engaging parts 43a and 43b as one side, and line segments of the length of the optical sheet 3 in the lateral direction as two sides. The inclination angle may be an apex angle of an isosceles triangle having an amount obtained by adding a length equivalent to the thickness of the polarizing plate 11 to the length of the residual portion from the sheet thickness of the optical sheet 3 within the height of the engaging parts 43a and 43b as one side. Further, the inclination angle is an extent that, even when the optical sheet 3 is inclined at the angle, brightness unevenness in the liquid crystal panel 1 does not occur.

The optical sheet 3 is held by the holding surface 41 of the holding plate 40 at the peripheral edge parts thereof, and then is inclined at the above-described inclination angle with respect to the light guide plate 52 and the liquid crystal panel 1 to be installed.

In a state in which the liquid crystal panel 1 is installed in the second chassis 4 so that the polarizing plate 11 abuts front tips of the engaging parts 43a and 43b, a distance (thick line arrow) between the polarizing plate 11 and the holding surface 41 is equivalent to a height of the engaging parts 43a and 43b on the one long side provided with the engaging parts 43a and 43b, while on another long side, the distance is equal to the sheet thickness of the optical sheet 3. Therefore, an edge part of the optical sheet 3 held by the holding surface 41 of the second chassis 4 on the region opposite to the region provided with the engagement hole 32 has almost no fluctuation gap (see FIG. 3).

Due to the above-described holding structure, fluctuation in a direction perpendicular to the surface of the optical sheet 3 may be restrained within a range of a spatial distance equivalent to the height of the engaging parts 43a and 43b of the second chassis 4, and damaging the optical sheet 3 may be prevented. The inclination angle of the optical sheet 3 with respect to the liquid crystal panel 1 is within a range of the spatial distance equivalent to the height of the engaging parts 43a and 43b, such that, even in a limited space of the thin type display apparatus 100, the fluctuation of the optical sheet 3 may be restrained.

The light source device of the display apparatus 100 is not limited to the edge light type using the above-described light emitting diodes 55. The light source 51 is not limited to the case of including the substrate 54 and the light emitting diodes 55, and a cold cathode fluorescent lamp (CCFL), hot cathode fluorescent lamp (HCFL), external electrode fluorescent lamp (EEFL) or the like may be used. Further, the light source 51 is installed so as to emit light inwardly from the one side surface on the inner long side of the third chassis 6, but it is not limited thereto, and the light source may be installed so as to emit light inwardly from the side surface on the short side thereof.

Embodiment 2

Figure 5:
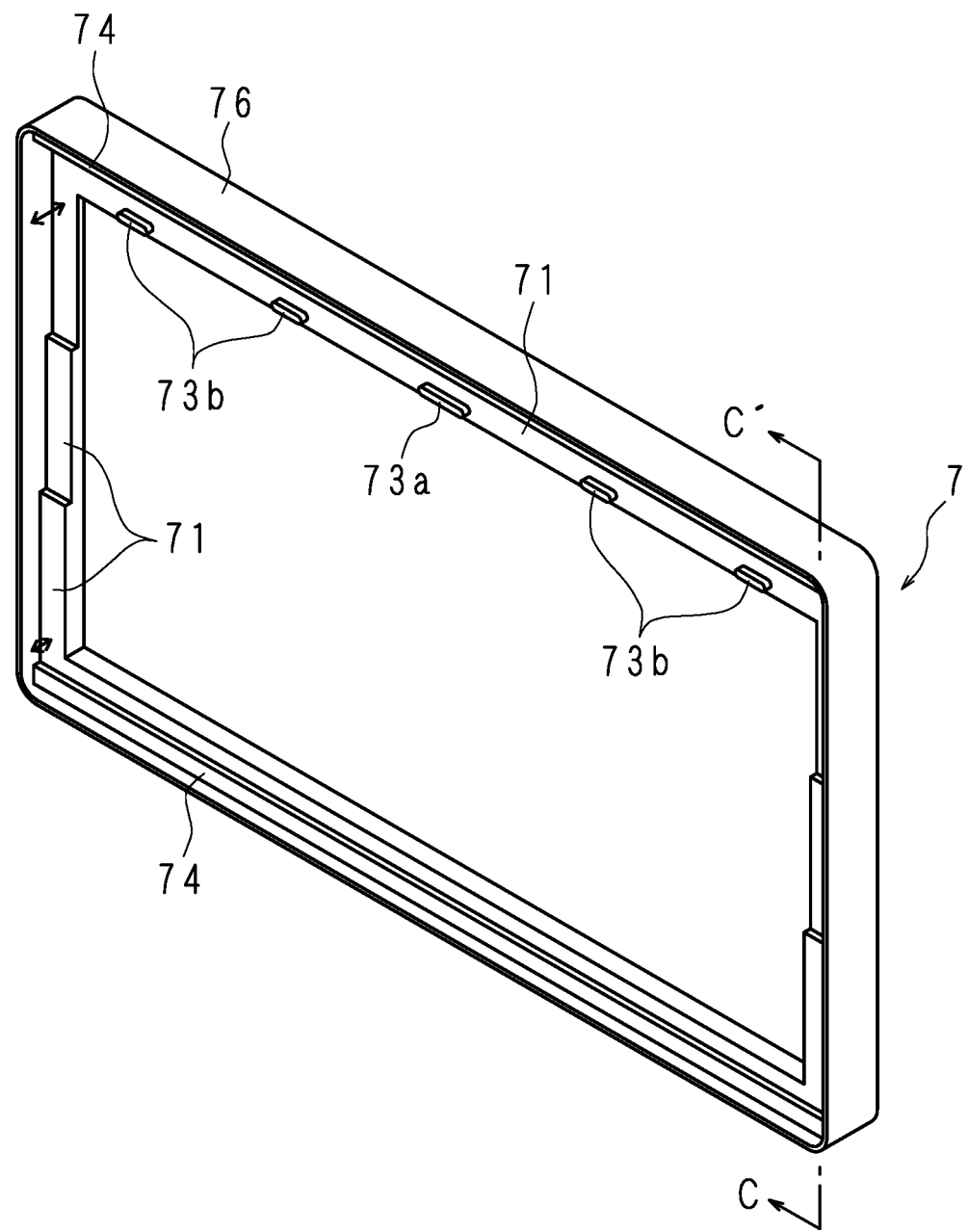
FIG. 5 is a perspective view schematically illustrating a second chassis according to Embodiment 2.
Figure 6:
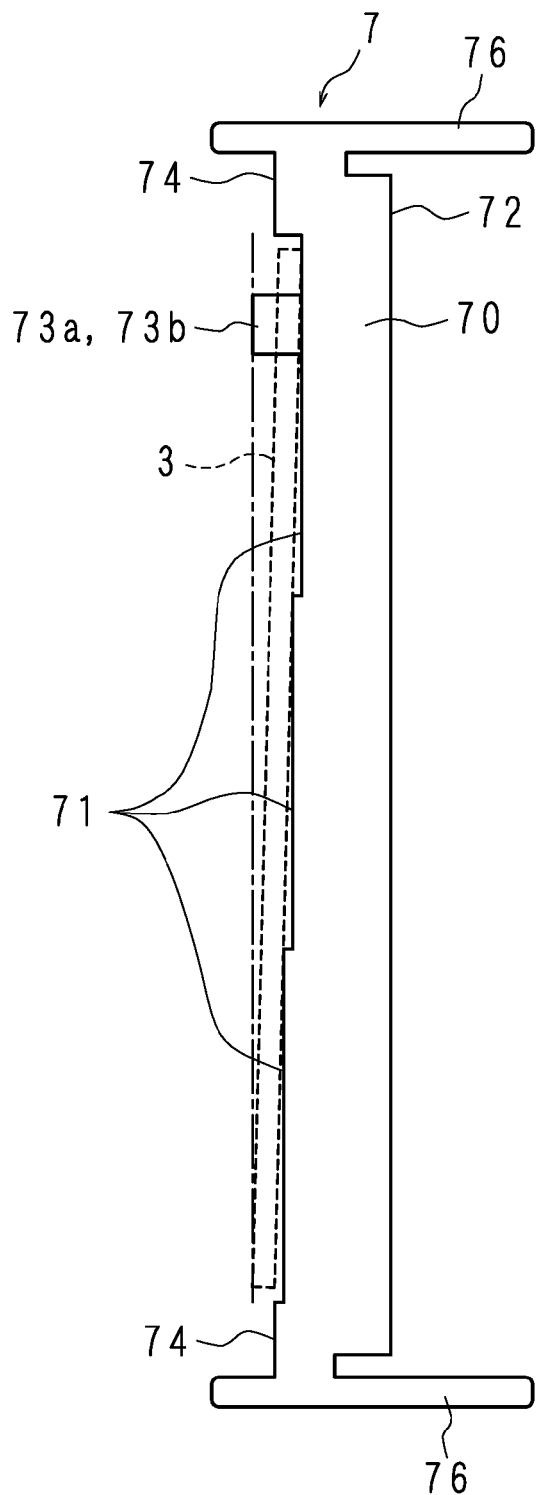
FIG. 6 is a longitudinal-sectional view taken on line C-C' of FIG. 5.

The structure of the second chassis 4 to prevent the optical sheet 3 from being fluctuated may be a structure as Embodiment 2 illustrated below. FIG. 5 is a perspective view schematically illustrating a second chassis 7 according to Embodiment 2, and FIG. 6 is a longitudinal-sectional view taken on line C-C' of FIG. 5. FIG. 6 illustrates a cross section when cutting an edge part of a holding plate 70 of the second chassis 7 on one short side in the lateral direction. Further, a dashed line in FIG. 6 illustrates an outline of the cross section of the optical sheet 3 to be held.

The second chassis 7 may be used as a substitute for the second chassis 4 according to Embodiment 1 as it is. Therefore, the configuration of other main components of the display apparatus 100, and the relationship with the other main components of the second chassis 7 will not be described in detail.

The second chassis 7 is a frame body provided with a peripheral plate 76 at outer peripheral edges of a rectangular plate-shaped holding plate 70, and a rectangular opening at a central part of the holding plate 70. The second chassis 7 has a T-shaped cross section with the longitudinal line is corresponding to the holding plate 70 and the horizontal line is corresponding to the peripheral plate 76. In the second chassis 7 according to Embodiment 2, also on both of the long sides, the holding plate 70 and the peripheral plate 76 are perpendicular to each other. However, the holding plate 70 has a structure in which one surface 71 gradually protrudes in three steps from one long side to another long side. In other words, the holding plate 70 has a thickness gradually increased from the one long side toward said another long side.

In addition, the second chassis 7 includes a plurality of engaging parts 73a and 73b arranged in the longitudinal direction at an edge part on the one long side of the one surface 71 of the holding plate 70. The plurality of engaging parts 73a and 73b include a total of five engaging parts of a center engaging part 73a and the other engaging parts 73b. Each of the engaging parts 73a and 73b is erectly disposed at the one surface 71 of the holding plate 70. The engaging parts 73a and 73b have an elliptical cross section elongated in the longitudinal direction of the holding plate 70, and a length of the elliptical cross section of the other engaging parts 73b is shorter than the length of the elliptical cross section of the center engaging part 73a.

In the gradually protruding surface 71 of the holding plate 70 of the second chassis 7, a height of the highest protrusion part is slightly lower than the height of the engaging parts 73a and 73b. A difference between the height of the highest protrusion part and the height of the engaging parts 73a and 73b is substantially equivalent to the sheet thickness of the optical sheet 3.

Further, the holding plate 70 of the second chassis 7 is provided with a peripheral groove in an outer peripheral edge of a surface 72 on a side opposite to the surface 71.

When fitting the second chassis 7 according to Embodiment 2 to the third chassis 6, an outer periphery of the side plate of the third chassis 6 is fitted to an inner periphery of the peripheral plate 76 of the second chassis 7, so that one long side of the second chassis 7 on the engaging parts 73a and 73b corresponds to the side having the notches 56 of the light guide plate 52, and the surface 72 opposite to the surface 71 provided with the engaging parts 73a and 73b faces the third chassis 6. Further, in this case, a peripheral end face of the side plate of the third chassis 6 is adapted so as to be inserted into the groove provided in the surface 72 of the second chassis 7. The surface 72 of the second chassis 7 according to Embodiment 2 is substantially parallel to the light guide plate 52, such that the spacer 83 has substantially the uniform thicknesse.

As illustrated in FIGS. 5 and 6, surfaces (hereinafter, referred to as a holding surface) 71 of the holding plate 70 of the second chassis 7 for holding the optical sheet 3 gradually protrude from the one long side provided with the engaging parts 73a and 73b toward said another long side. By the above-described second chassis 7, the first chassis 2 and the third chassis 6, the light guide plate 52 and the liquid crystal panel 1 are positioned substantially parallel to the surface perpendicular to the peripheral plate 76. A one-dot chain line in FIG. 6 corresponds to a surface of the polarizing plate 11 provided on the surface opposite to the display surface of the liquid crystal panel 1 (see FIG. 3), and is substantially parallel to the surface perpendicular to the peripheral plate 76.

The optical sheet 3 is held by the holding surface 71 of the holding plate 70 at the peripheral edge parts thereof. In this case, due to features having a tension, the optical sheet 3 abuts two stepped portions in a line shape of the longitudinal direction among the stepped-surfaces of the holding surface 71, and is inclined in the lateral direction with respect to the light guide plate 52 and the liquid crystal panel 1 to be installed.

The inclination angle of the optical sheet 3 with respect to the liquid crystal panel 1 at this time substantially corresponds to an apex angle of an isosceles triangle having a line segment of the length of the residual portion from the sheet thickness of the optical sheet 3 in the standing direction of the engaging parts 73a and 73b as one side, and the line segments of the length of the optical sheet 3 in the lateral direction as two sides. Further, the inclination angle is an extent that, even when the optical sheet 3 is inclined at the angle, brightness unevenness in the liquid crystal panel 1 does not occur.

By holding the optical sheet 3 as described above, in a state in which the liquid crystal panel 1 is installed in the second chassis 7 so that the polarizing plate 11 abuts the front tips of the engaging parts 73a and 73b, a distance (thick line arrow) between the polarizing plate 11 and the holding surface 71 is a height of the engaging parts 73a and 73b on the one long side provided with the engaging parts 73a and 73b, while on said another long side, the distance is equal to the sheet thickness of the optical sheet 3. Therefore, an edge part of the optical sheet 3 on the side opposite to the side provided with the engagement hole 32 has almost no fluctuation gap (see FIG. 3).

Due to the above-described holding structure, fluctuation of the optical sheet in a direction perpendicular to the surface of the sheet may be restrained within a range of a spatial distance equivalent to the height of the engaging parts 73a and 73b of the second chassis 7, and damaging the optical sheet 3 may be prevented. The inclination of the optical sheet 3 with respect to the liquid crystal panel 1 is within a range of the spatial distance equivalent to the height of the engaging parts 73a and 73b, such that, even in the limited space of the thin type display apparatus 100, the fluctuation of the optical sheet 3 may be restrained.

A shape of the chassis for holding the optical sheet 3 is not limited to the configurations of the second chassis 4 or the second chassis 7 illustrated in the above-described Embodiments 1 and 2. When holding the optical sheet 3 by the second chassis, the holding structure for allowing the position of the edge of the optical sheet 3 on the side opposite to the side having the engagement hole 32 to be equal to the position of the front tip of the engaging part of the second chassis in the thickness direction may also be achieved by other shapes.

For example, it may be configured in such a manner that a plurality of convex parts are erectly disposed on edge parts corresponding to both short sides of a holding surface of the second chassis, and the plurality of convex parts have a length gradually increased from one long side provided with the engaging parts toward another long side. In this case, the convex part of said another long side is adapted so as to have a length shorter than the length to the front tip of the engaging part by the sheet thickness of the optical sheet 3. In addition, said another long side is provided with convex parts for holding the edge side of the optical sheet 3 on the side opposite to the engagement hole 32, and the convex part is also adapted so as to have a length shorter than the length to the front tip of the engaging part. Thereby, a length of a space in the thickness direction, into which the edge side of the optical sheet 3 on the side opposite to the engagement hole 32 is entered, is equal to the sheet thickness of the optical sheet 3. Furthermore, the shape of the convex part erectly disposed on the holding surface is not particularly limited. For example, the convex part may have an inclination surface on the end thereof so as to be laid along the surface of the optical sheet 3, may be configured in a rib shape parallel to the short side direction or the long side direction, and may have a protruded end portion so as to hold the optical sheet 3 at a point.

The engagement hole 32 of the optical sheet 3 is not limited to the shape of being provided in the edge part on the one long side as illustrated in Embodiments 1 and 2. In some cases, the optical sheet 3 has a plurality of engagement holes 32 provided in two sides of the short side and the long side of the optical sheet. Also in this case, the optical sheet 3 is held so as to be inclined by the inclined holding surface 41 or the holding surface 71 having stepped-protrusions, so that the edge part on the long side of the side opposite to the long side provided with the engaging parts 43a and 43b (or 73a and 73b), of the two long sides of the second chassis 4 (or 7) is close to the liquid crystal panel 1 side.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A display apparatus including a display panel and an optical sheet of rectangular shape provided behind the display panel, comprising:
    a holding frame body provided behind the optical sheet having an upper frame, a lower frame, a left frame and a right frame, and having a rectangular opening which is surrounded by the upper frame, the lower frame, the left frame and the right frame, wherein each of the upper frame, the lower frame, the left frame and the right frame has a holding surface for holding the optical sheet by contacting with peripheral parts of the optical sheet;
    a plurality of engagement holes juxtaposed in an edge part of an upper peripheral part of the optical sheet corresponding to the upper frame; and
    a plurality of engaging parts provided to stand on a holding surface of the upper frame, the plurality of engaging parts directly facing the plurality of engagement holes of the optical sheet;
    wherein a holding surface of the lower frame is closer to the display panel than a holding surface of the upper frame and is farther from the display panel than a plane, the plane being parallel to the display panel and including front tips of the engaging parts;
    wherein a polarizing plate is provided on a surface of the display panel opposite to a display surface of the display panel, and
    wherein a distance between the polarizing plate and the holding surface of the upper frame is equivalent to a height of the plurality of engaging parts, and the polarizing plate is in direct contact with the engaging parts of the upper frame.

2. The display apparatus according to claim 1, wherein the holding surface of each of the upper frame, the lower frame, the left frame and the right frame is inclined with respect to the display panel which are formed so that a lower side of the holding surface is closer to the display panel than an upper side of the holding surface.

3. The display apparatus according to claim 1, wherein the holding surface of each of the left frame and the right frame has stepped-protrusions which are formed so that a lower region of the holding surface of each of the left frame and the right frame is closer to the display panel than an upper region of the holding surface of each of the left frame and the right frame.

4. The display apparatus according to claim 1, wherein a distance between the polarizing plate and the holding surface of the lower frame is substantially equal to a thickness of the optical sheet.

5. The display apparatus according to claim 1, wherein the holding frame body comprises a surface opposite to the holding surface adapted to press a peripheral edge part of a light guide plate.

6. The display apparatus according to claim 5, wherein the display panel is substantially parallel to the light guide plate, and the optical sheet is inclined with respect to the light guide plate.

7. The display apparatus according to claim 1, wherein each of the plurality of engaging parts are engaged into the plurality of engagement holes respectively, and front tips of the plurality of engaging parts abut the polarizing plate.

* * * * *